United States Patent [19]
Giwosky

[11] 3,863,446
[45] Feb. 4, 1975

[54] FLUID POSITIONING APPARATUS
[75] Inventor: Harry L. Giwosky, Milwaukee, Wis.
[73] Assignee: Jordan Controls, Inc., Milwaukee, Wis.
[22] Filed: July 16, 1973
[21] Appl. No.: 379,326

[52] U.S. Cl. ................. 60/388, 60/390, 60/431, 60/494, 251/25
[51] Int. Cl. ............................. F15b 9/03
[58] Field of Search ............ 60/388, 390, 423, 431, 60/432, 449, 477, 494, DIG. 2, 903, 906, 433, 434; 251/25

[56] References Cited
UNITED STATES PATENTS

| | | | |
|---|---|---|---|
| 2,374,909 | 5/1945 | Williams | 60/DIG. 2 |
| 2,945,677 | 7/1960 | Kammerer | 60/431 |
| 3,125,856 | 3/1964 | Branson et al. | 60/DIG. 2 |
| 3,424,260 | 1/1969 | Stone et al. | 60/433 X |

Primary Examiner—Edgar W. Geoghegan
Attorney, Agent, or Firm—Andrus, Sceales, Starke & Sawall

[57] ABSTRACT

A hydraulic piston-cylinder operator is connected to the output of a positive displacement pump having an inlet connected to a reservoir and having a return conduit to the hydraulic reservoir having a pressure dropping element. The operator has a reset spring urging the unit to a first position. A variable speed direct current motor drives the pump and is controlled by a servo system with a command voltage signal and a feedback potentiometer voltage signal. An amplifier compares the signal and forms an error voltage which actuates the motor to control and hold the speed at that required to position the hydraulic operator against the spring to null the command signal.

5 Claims, 1 Drawing Figure

PATENTED FEB 4 1975 3,863,446
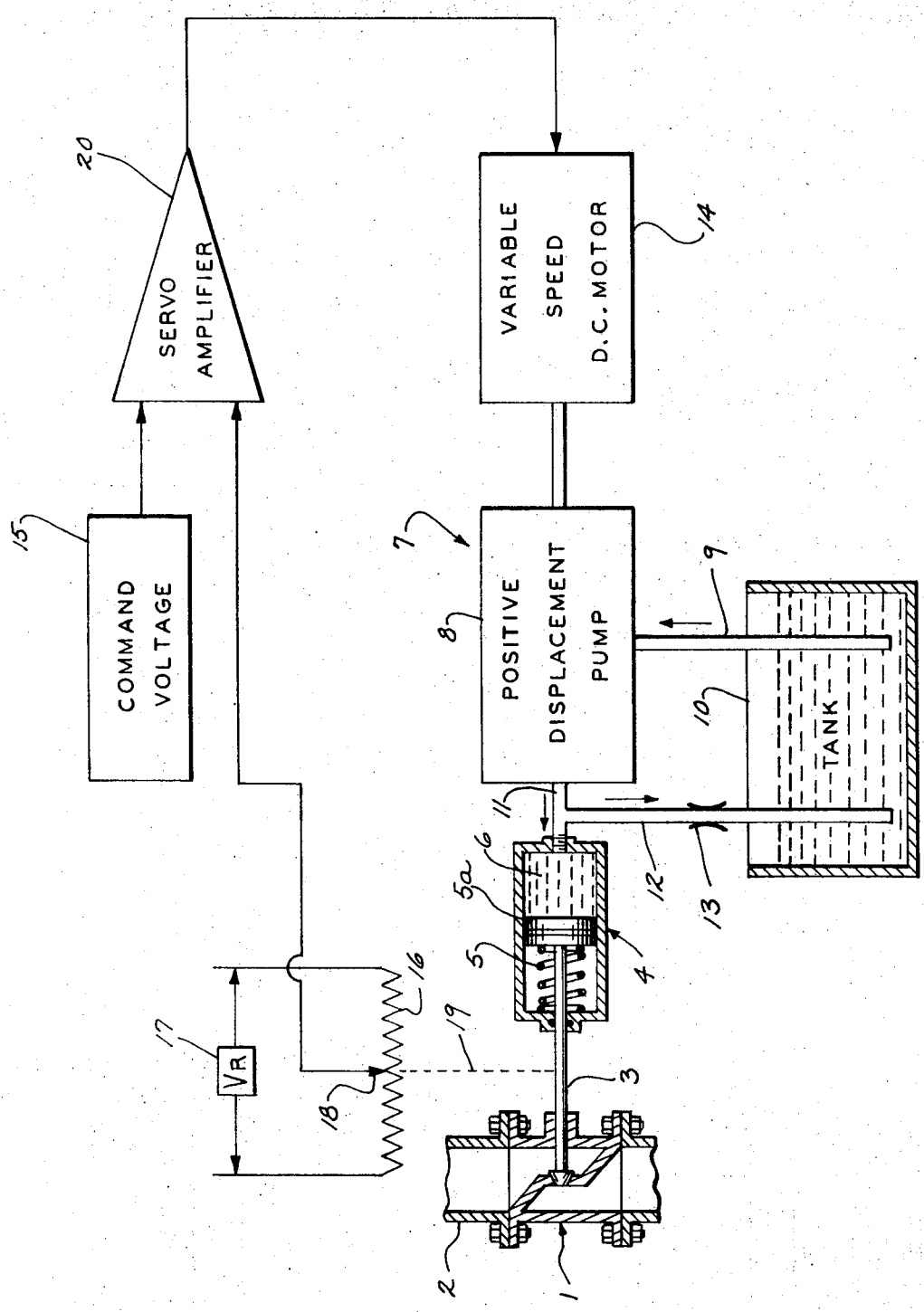

FLUID POSITIONING APPARATUS

BACKGROUND OF THE INVENTION

This invention relates to a fluid positioning apparatus and particularly to a hydraulic operator having an output element positioned in accordance with an impressed hydraulic pressure.

In various operating and control systems, positioning apparatus is employed to automatically and remotely control an element. Thus, linear actuators are widely employed to position valves, regulators, dampers and like devices. For example, in process control systems a flow valve may be employed to variably control fluid in the system. A stem type valve is widely employed to open and close the flow passageway. The valve stem may be connected in an automatic positioning system for selectively positioning the valve stem.

Hydraulically actuated or powered devices may be advantageously employed. In a particular design a positive displacement pump is driven at a constant speed by a suitable electrical motor. The output of the pump is connected to the input of a piston-cylinder unit, having a piston shaft being connected directly to position a valve stem or other element. The pressure input is generally controlled by varying the flow resistance, for example, through a variable leak port or orifice connected to the downstream side of the pump connection to the piston-cylinder unit.

Although the prior art has been widely employed, a relatively inexpensive and reliable hydraulic operator design which will operate to maintain a very stable and accurate setting of the controlled element and which is particularly adapted to connection in a servo control loop is not widely and readily available.

SUMMARY OF THE PRESENT INVENTION

The present invention is particularly directed to an improved hydraulic positioning control which is readily adapted to a closed loop servo system to maintain automatic, accurate, predetermined positioning of an element. Generally, in accordance with the present invention a hydraulic operator is connected to the output of a positive displacement pump having a continuous bypass means to a reference pressure through a pressure dropping element connected to the discharge side of the pump. In accordance with the present invention, the pump is driven from a variable speed prime mover such as a variable speed direct current motor. The motor is controlled by a command signal which determines the speed of the motor and therefore the pump to produce a predetermined control of the output pressure applied to the hydraulic operator. This system is particularly adapted to a closed loop servo system wherein a comparator such as a servo amplifier is connected to a command voltage or other similar signals and to a feed-back signal generator, such as the movable tap of a potentiometer. The tap is coupled to the output of the operator such as the valve stem. The output of the amplifier is an error voltage which actuates the motor to control the speed and hold the speed at that required to position the hydraulic operator to null the command signal.

The present invention provides a reliable control for operation of a hydraulic valve operator to rapidly establish and hold a selected position.

BRIEF DESCRIPTION OF THE DRAWING

The Drawing furnished herewith is a diagrammatic illustration of a hydraulic valve positioning system constructed in accordance with the teaching of the present invention.

DESCRIPTIONN OF THE ILLUSTRATED EMBODIMENT

Referring to the Drawing, a valve unit 1 is shown connected in a flow line 2 forming a part of a flow system such as an automatic process control system. The illustrated valve unit 1 is shown including a slip stem type having a control shaft or stem 3 moving axially to open and close the valve opening. The valve stem 3 is selectively positioned by a suitable pressure responsive hydraulic valve operator 4, shown as a conventional piston-cylinder unit including a return spring 5 continuously biasing the piston 5a to a fully retracted position. A pressure chamber 6 is formed on the opposite side of the piston from spring 5 and connected to a hydraulic pressure source assembly 7 for pressurizing the cylinder unit 4 and thereby moving the stem 3 in the opposite direction against the force of spring 5. In the illustrated embodiment of the invention, the spring 5 tends to open the valve while the pressure in chamber 6 tends to close the valve. Obviously, the valve can be oppositely constructed to move the valve in the opposite manner, and the valve and operator may, of course, be of any other suitable construction which is responsive to a fluid pressure.

In the illustrated embodiment of the invention, the source 7 includes a suitable positive displacement pump 8 connected via line 9 to a hydraulic reservoir 10. An output line 11 from the discharge side of pump 8 is connected by a return line 12 to the tank 10 to establish a circulating system. The positive displacement pump 8 may be of any suitable construction which establishes a unit transfer for each revolution of the pump 8 with the output pressure at line 11 directly controlled by the opposition created to flow from the pump 8. For example, various rotary gear pumps are commercially available and are widely employed such that the cost is relatively low. The return line 12 includes a fixed restrictor 13 which constitutes a pressure dropping means in the flow system.

The output line 11 of the pump 8 is also connected, as shown, directly to the chamber 6 such that the pressure upstream of restrictor 13 is applied to the operator.

The pressure drop across the restrictor 13 is essentially directly proportional to the volume of flow therethrough. Therefore, by varying the speed of the positive displacement pump 8, the volume of flow is varied with a corresponding change in the pressure drop through the orifice 13. This directly varies the pressure at the output side of the pump 8 and correspondingly varies the working pressure in the chamber 6 of operator 4.

The pump 8 is driven from a controlled prime mover 14 shown as a variable speed, direct current (DC) motor 14. By controlling the speed of the motor 14, the volume output of the pump 8 is controlled to correspondingly establish a pressure control applied by the hydraulic actuator 4.

A closed loop system is shown wherein the pressure source assembly 7 is actuated from a command voltage source 15 which establishes a voltage signal proportional and directly related to the desired positioning of the valve stem 3. This command signal is compared with a voltage feedback signal generated by suitable feedback source shown as a potentiometer 16 connected to a DC input voltage source 17. The potentiometer includes a tap 18 which is coupled to the stem 3 as shown by the dotted coupling 19 and is thus positioned directly in accordance with the valve stem 3. The outer voltage appearing on tap 18 is therefore directly proportional to the positioning of stem 3 and provides a signal which can be directly compared with the command voltage. The tap 18 and the command voltage source 15 are connected as the two inputs to servo amplifier 20, the output of which is an error signal coupled to directly control the variable speed DC motor 14.

The operation of the illustrated embodiment of the invention is briefly summarized as follows:

The command voltage 15 is set in accordance with the desired positioning of the stem 3. This voltage is compared with the actual feedback voltage of the tap 18 and generates the error signal. The DC motor operates in accordance with the level of this error signal to correspondingly drive the pump 8, and thereby produces a corresponding pressure related to such speed. The hydraulic piston-cylinder operator 4 responds to the output pressure in chamber 6 and repositions the piston stem 3. Movement of stem 3 changes the feedback voltage to reduce the error signal. The stem 3 and tap 18 are repositioned until such time as the voltage on tap 18 equals the command voltage 15 at which point the error signal maintains the output of the positive displacement pump 8 to balance the force of spring 5.

When it is desired to reduce the valve opening, the command voltage is reduced. This results in a removal of the error signal, and the DC motor 14 stops. The output of the pump 8 and, consequently, the pressure is removed from the line 11 and chamber 6. Spring 5 then establishes an automatic return of the piston 5a with the hydraulic flow returning through the by-pass or return line 12 and particularly through orifice 13 to the tank 10. By proper selection of spring 5, the return rate is accurately controlled and particularly may be matched to the closing characteristics established by the pump 8.

Applicant has found that the combination of a variable speed positive displacement pump with a suitable resilient reset means provides a relatively simple, reliable and inexpensive control system.

Various modes of carrying out the invention are contemplated as being within the scope of the following claims, particularly pointing out and distinctly claiming the subject matter which is regarded as the invention.

I claim:

1. A positioning apparatus for accurately, mechanically positioning and holding a load in any one of a plurality of different load positions comprising a variable speed prime mover, a positive displacement pump coupled to and driven by said prime mover, a fluid responsive positioning device having a mechanical output for connection to a mechanical load and having a resilient return means, a fluid circuit means for connecting the positive displacement pump to the positioning device and a by-pass means including a restricted return means whereby the fluid pressure established is dependent on the speed of the prime mover to establish a position of the mechanical output against said resilient means, operating means connected to vary the speed of the prime mover and adjust the fluid pressure to said fluid responsive positioning device, and a servo control means connected to sense the position of the mechanical output and connected to control said operating means to said prime mover to adjust the speed of the prime mover in accordance with the sensed position and thereby the fluid pressure in said fluid responsive positioning device to variously position said mechanical output in any selected position between said limits and to hold said position with changes in the fluid circuit means.

2. The positioning apparatus of claim 1 wherein said restricted return means is a conduit means connected to the output of the pump and to the positioning device and includes a fixed orifice.

3. The positioning apparatus of claim 1 wherein said prime mover is a variable speed D.C. motor, said fluid responsive positioning device is a piston-cylinder unit having a resilient reset means, said fluid circuit means connects the output of said positive displacement pump to said cylinder unit to oppose said reset means, said by-pass means is a return conduit having a fixed orifice whereby the fluid pressure established is dependent on the speed of the D.C. motor and a servo control means connected to control said motor.

4. The positioning apparatus of claim 3 wherein said fluid pressure is a hydraulic medium.

5. The positioning apparatus of claim 4 wherein said prime mover is a variable speed motor, said fluid responsive positioning device is a spring returned piston-cylinder unit having an output rod and a reset spring, said positive displacement pump having a hydraulic output connected directly to said piston-cylinder unit and to said restricted return means, said return means including a fixed orifice, said servo control means including a means to sense the position of said output rod and establishing a proportional signal voltage, means to establish a command voltage corresponding to a desired setting of said rod, and means to compare said voltages and vary the speed of the motor to establish and maintain a selected fluid pressure to correspondingly set and hold the rod in the desired position.

* * * * *